US010268566B2

(12) United States Patent
Merkle et al.

(10) Patent No.: US 10,268,566 B2
(45) Date of Patent: Apr. 23, 2019

(54) DEBUGGING IN A PRIVATE CLOUD ENVIRONMENT

(71) Applicant: SAP SE, Walldorf (DE)

(72) Inventors: Marcel Merkle, Leimen (DE); Steffen Schreiber, Frankenthal (DE); Johannes Scheerer, Heidelberg (DE); Elena Oresharova, Blagoevgrad (BG); Andreas Schoesser, Karlsruhe (DE); Thomas Klink, Mörlenbach (DE); Dietrich Mostowoj, Ludwigshafen (DE); Matthias Braun, Illingen (DE); Andreas Mueller, Brühl (DE); Andreas Steiner, Ludwigshafen (DE); Marc Becker, Mannheim (DE)

(73) Assignee: SAP SE, Walldorf (DE)

( * ) Notice: Subject to any disclaimer, the term of this patent is extended or adjusted under 35 U.S.C. 154(b) by 174 days.

(21) Appl. No.: 15/343,954

(22) Filed: Nov. 4, 2016

(65) Prior Publication Data
US 2018/0129580 A1 May 10, 2018

(51) Int. Cl.
*G06F 11/00* (2006.01)
*G06F 11/36* (2006.01)
(Continued)

(52) U.S. Cl.
CPC ........ *G06F 11/362* (2013.01); *G06F 11/3664* (2013.01); *H04L 63/0281* (2013.01); *H04L 67/02* (2013.01)

(58) Field of Classification Search
CPC .......................... G06F 11/362; G06F 11/3664
See application file for complete search history.

(56) References Cited

U.S. PATENT DOCUMENTS

| 6,988,014 B2 | 1/2006 | Kraemer et al. |
| 7,930,149 B2 | 4/2011 | Haag et al. |
| 8,527,960 B2 | 9/2013 | Schmelter et al. |
| 8,584,098 B2 | 11/2013 | Schmelter et al. |
| 8,656,407 B2 | 2/2014 | Wintergerst et al. |

(Continued)

FOREIGN PATENT DOCUMENTS

| CN | 104 077 405 A | 10/2014 |
| WO | WO 2007/138599 A2 | 12/2007 |
| WO | WO 2016/046929 A1 | 3/2016 |

OTHER PUBLICATIONS

EPO Communication and extended European Search Report for related foreign application No. 17001118.3-1871; dated Oct. 9, 2017; 10 pages.

*Primary Examiner* — Bryce P Bonzo
*Assistant Examiner* — Katherine Lin
(74) *Attorney, Agent, or Firm* — Fish & Richardson P.C.

(57) ABSTRACT

The present disclosure involves systems, software, and computer implemented methods for remotely debugging applications in a private cloud environment. One example method includes establishing a first secure connection with a client device in response to receiving a request from the client device for a secure debugging session to remotely debug an application instance running in a private cloud environment. A host that is hosting the application instance is identified. A second secure connection is established with the identified host. A request is submitted, over the second secured connection, to the identified host, to instantiate a debug proxy process. The debug proxy process is configured to establish a secure inter-process communication channel with the application instance and instruct the application instance to run in a debug mode.

18 Claims, 5 Drawing Sheets

(51) Int. Cl.
  *H04L 29/06*     (2006.01)
  *H04L 29/08*     (2006.01)

(56) References Cited

U.S. PATENT DOCUMENTS

| | | |
|---|---|---|
| 8,839,208 B2 | 9/2014 | Schmelter et al. |
| 8,850,403 B2 | 9/2014 | Wintergerst et al. |
| 8,959,477 B2 | 2/2015 | Mueller |
| 8,984,336 B1* | 3/2015 | Das ................. G06F 11/0721 714/15 |
| 8,997,070 B2 | 3/2015 | Klemenz et al. |
| 9,117,019 B2 | 8/2015 | Wintergerst et al. |
| 9,129,056 B2 | 9/2015 | Schmelter et al. |
| 9,141,439 B2 | 9/2015 | Scheerer et al. |
| 9,201,759 B2 | 12/2015 | Wintergerst et al. |
| 9,280,444 B2 | 3/2016 | Scheerer et al. |
| 9,430,355 B2 | 8/2016 | Braun et al. |
| 2006/0271568 A1* | 11/2006 | Balkir ............... G06F 17/30592 |
| 2010/0082497 A1 | 4/2010 | Biesemann et al. |
| 2010/0162212 A1* | 6/2010 | Stall .................. G06F 11/3664 717/124 |
| 2010/0241790 A1 | 9/2010 | Whang et al. |
| 2012/0047079 A1 | 2/2012 | Biesemann et al. |
| 2012/0072576 A1 | 3/2012 | Yumerefendi et al. |
| 2013/0013605 A1 | 1/2013 | Stanfill |
| 2014/0245266 A1* | 8/2014 | Sun .................. G06F 11/3664 717/124 |
| 2015/0033078 A1* | 1/2015 | Wintergerst ........ G06F 11/362 714/38.1 |
| 2015/0135165 A1* | 5/2015 | Simernitski ......... G06F 11/3664 717/124 |
| 2017/0098010 A1 | 4/2017 | Kohinata et al. |

\* cited by examiner

US 10,268,566 B2

DEBUGGING IN A PRIVATE CLOUD ENVIRONMENT

TECHNICAL FIELD

The present disclosure relates to computer-implemented methods, software, and systems for remotely debugging applications in a private cloud environment.

BACKGROUND

A software developer may wish to debug an application. To debug the application, the developer can run the application within a debugging environment. The developer can, within the debugging environment, set one or more breakpoints at various programming statements that are included in program code associated with the application. The debugging environment can halt execution of the running application when program code is reached that is associated with a programming statement that has a breakpoint. While execution is halted, the developer can inspect the state of the application, such as the value of variables, and in some environments, can change the value of a variable during execution. The developer can instruct the debugging environment to resume execution of the program after a variable has been changed. Inspection, resumption, and monitoring of program results can assist the developer in finding a problem with the program code of the application.

SUMMARY

The present disclosure involves systems, software, and computer implemented methods for remotely debugging applications in a private cloud environment. One example method includes establishing a first secure connection with a client device in response to receiving a request from the client device for a secure debugging session to remotely debug an application instance running in a private cloud environment. A host that is hosting the application instance is identified. A second secure connection is established with the identified host. A request is submitted, over the second secured connection, to the identified host, to instantiate a debug proxy process. The debug proxy process is configured to establish a secure inter-process communication channel with the application instance and instruct the application instance to run in a debug mode.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

In a public cloud environment, applications can run in virtual environments and can be isolated from one another. In a private cloud environment, multiple applications can run on a same physical host, on the same hardware, without virtualized environments. Private cloud environments can offer default debugging support for applications, but debugging communications can be configured to use a port that may be accessible by multiple users or applications. An application host may not be reachable from a client host. Alternatively and advantageously, a developer can, using systems described herein, remotely debug an application running in a private cloud environment that is configured to provide robust support for security, authorization, and authentication. For example, a private cloud environment that is used by multiple users can be configured to enable only authorized users to have authority to remotely debug applications. An authorization can be granted to a particular user to debug a particular application or a particular instance of an application, for example. A particular instance can be debugged without affecting other running instances. Debugging data can be encrypted when transferred within the private cloud environment. Secure, interprocess communication connections can be used which can prevent unauthorized users or processes from intercepting debugging data. An instance of an application can be debugged on demand or at application instance startup. A debugging session can be managed so that an open debugging connection is not left open after a debugging session ends, preventing an unauthorized user from connecting to a left-open connection.

Enabling a developer to debug an application in a private cloud environment can result in various other advantages other than those listed above. For example, the developer can find and correct errors more quickly as compared to not having use of a debugger. Debugging the application in a private cloud environment in which the application was designed to execute can result in finding errors that may have otherwise occurred later during production, since executing the application in the private cloud environment while debugging may result in environment-specific errors that may not have otherwise occurred if the developer simulated running the application locally on a developer client device, for example.

Figure 1:
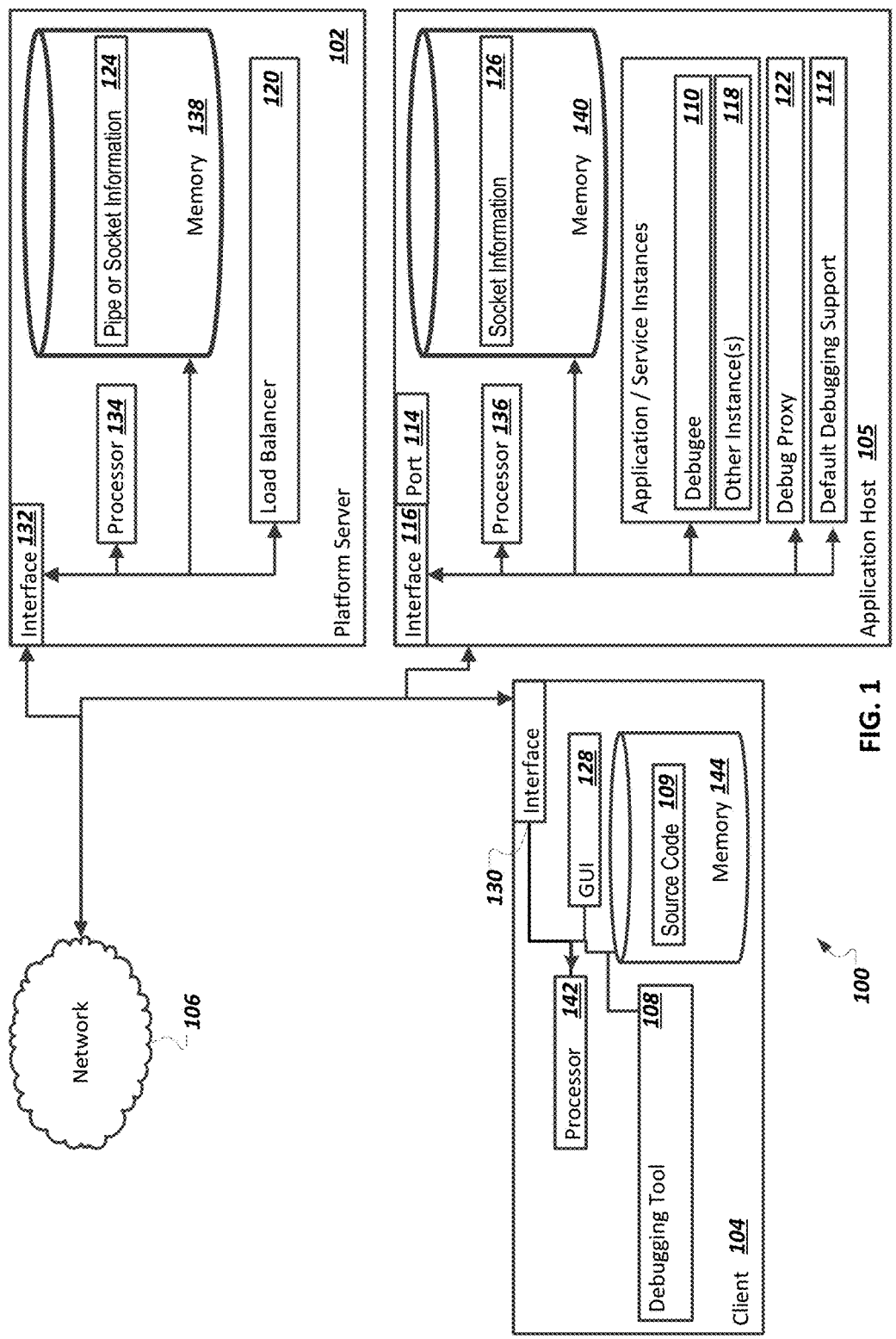
FIG. 1 is a block diagram illustrating an example system for remotely debugging applications in a private cloud environment.

FIG. 1 is a block diagram illustrating an example system 100 for remotely debugging applications in a private cloud environment. Specifically, the illustrated system 100 includes or is communicably coupled with a platform server 102, a client device 104, an application host 105, and a network 106. The platform server 102, the client device 104, the application host 105, and the network 106 can be included in a private cloud environment that is used by and associated with, for example, a single organization and not generally available to users outside of the organization. The private cloud environment can be protected by a corporate firewall, for example. Although shown separately, in some implementations, functionality of two or more systems or servers may be provided by a single system or server. In some implementations, the functionality of one illustrated system or server may be provided by multiple systems or servers.

The platform server 102 can be used to manage communication between the client device 104 and the application host 105. The platform server 102 manages services (e.g., a database connection) and micro service based applications in a private environment that can include multiple hosts 105 connected by the network 106. The platform server 102 can control the flow of information and requests for operations between the client device 104 and an application instance, including information and requests occurring during the entire life cycle of the application instance. The platform server 102 can generate executable packages from application files. The platform server 102 can start, stop and scale application instances. The platform server 102 can clear up stopped instances, and store and provide access to logs. The platform server 102 can redirect and balances the requests sent to applications and secure connections with the applications. The platform server 102 can include multiple processes running on different host machines.

An example operation associated with the platform server 102 includes the client device 104 sending a request to toggle a breakpoint in a specific location of a debugged instance to the platform server 102 and the platform server 102 dispatching the request to an appropriate application instance. The platform server 102 and the application host can be running on the same or different physical servers.

A developer can use a debugging tool 108 on the client device 104 to debug an application. The debugging tool 108 can provide benefits unavailable in other software development tools. Integrated development environments (IDEs), static analysis tools, and compilers cannot always ensure the functional correctness of applications, for example. Large applications can have considerable size which can make static program analysis of a complete application challenging or impractical.

Application defects not found using static tools can be found dynamically, using the debugging tool 108. The general process of debugging works, in one example, as follows. First, an executing application can be put into a debug mode by the client device 104. Next, the developer can connect the debugging tool 108 to the client device 104. For example, the client device 104 can start the application in a debug mode or the debugging tool 108 can be connected with an already executing application via the client device 104. The developer can use the debugging tool 108 to break and resume the application execution and inspect the state of the application, such as by inspecting source code 109 of the application, variable, and other data values at a given point in time, etc. In some implementations, the developer may be able to change the state of the application through the debugging tool 108 or change the application code to be executed. When the developer is finished debugging, the debugging tool 108 may disconnect from the application or terminate the application execution.

The debugging tool 108 can be used locally on the client device 104 (e.g., both the application and the debugging tool 108 can execute locally on the client device 104). As another example, the debugging tool 108 can be used to remotely debug an instance of an application instance (e.g., a "debugee" instance 110) running on the application host 105 within the private cloud environment. The application host 105 may provide default debugging support tools 112, but the default debugging support tools 112 may not provide satisfactory security. For example, the default debugging support tools 112 may be configured to use a port 114 associated with a network interface 116 that is available to other users or processes in the private cloud environment. Another user or process may be able to connect using the port 114 to an application being debugged, for example. When remotely debugging the debugee instance 110 using the debugging tool 108, the developer may desire to use a different, secure, private connection, without concerns that other users or processes may be able to view or interfere with debugging data or commands. Accordingly, and as described in more detail below, the remote debugging connection can be encrypted and authenticated.

Other instances 118 of the application can be executing on the application host 105 along with the debugee instance 110. The developer may want to debug the debugee instance 110 without affecting the execution of the other instances 118. The other instances 118 may be production instances, for example. The debugee instance 110 can also be a production instance that is currently executing, and the developer can connect the debugging tool 108 to the currently running debugee instance 110, for example, to troubleshoot an issue with the production instance. As another example, the developer can desire to start the debugee instance 110 as a new instance for testing purposes, where the debugee instance 110 is not a production instance. Debugging the debugee instance 110 while the other application instances 118 execute is described in more detail below.

In general, the application host 105 can host the execution of the application (e.g., the debugee instance 110 and the other instances 118) while also hosting other applications. As such, various users and processes may be associated with the application host 105. Remote debugging of the debug instance 110 can be configured so that only certain users (e.g., the developer and possibly other authorized users) can debug the debugee instance 110. A developer can be prohibited from debugging an application associated with another developer, for example. As another example, remote debugging can be configured so that certain users are granted permission to debug any instance of a particular application. As yet another example, remote debugging can be configured so that only certain users can debug applications in general on the application host 105.

Remote debugging connections are described in more detail below. As an overview, the client 104, on behalf of the debugging tool 108, can send a request to remotely debug the debugee instance 110 to the platform server 102. The request can be sent using HTTPS (HyperText Transfer Protocol Secured), for example, which can provide encryption. The platform server 102 can determine that the application host 105 is executing the debugee instance 110 (e.g., if the debugee instance 110 has already started). As another example, a load balancer can determine that the application host 105 is selected to execute the debugee instance, possibly among other application hosts (e.g., if the request is to start the debugee instance 110 in a debug mode).

The platform server 102 can send a request to the application host 105 to instantiate a debug proxy 122 on the application host 105 for use in the remote debugging session. The platform server 102 can establish a secure connection between the platform server 102 and the debug proxy 122, such as by using secure sockets, or some other type of authenticated interprocess communication connection (e.g., using pipe or socket information (e.g., information to be used as parameters for operating system function calls) 124). The debug proxy 122 can establish a secure connection with the debugee instance 110, such as by using UNIX domain sockets (e.g., using socket information (e.g., parameters) 126). The debug proxy 122 can instruct the debugee instance 110 to switch to (or start in) a debug mode.

After the respective secure connections (between the client device 104 and the platform server 102 and between the platform server 102 and the debug proxy 122) have been established, the debugging tool 108 can send a debugging command over the secured connections for receipt by the debug proxy 122. The debug proxy 122 can send the debugging command to the debugee instance 110 and can receive debugging data from the debugee instance 110 in response to the debugee instance 110 processing the debugging command in the debug mode. The debug proxy 122 can forward the debugging data, to the platform server 102, and the platform server 102 can send the debugging data over a secured connection, to the debugging tool 108. A user interface of the debugging tool 108 can be updated (e.g., on a GUI (Graphical User interface) 128) in response to the received debugging data. In a similar fashion, other debugging commands and debugging data can be sent over the secured connections, while the developer remotely debugs the debugee instance 110. From the perspective of the developer, remotely debugging the debugee instance 110 can be performed in a same manner and with a same user interface used for debugging an application executing locally on the client device 104.

As used in the present disclosure, the term "computer" is intended to encompass any suitable processing device. For example, although FIG. 1 illustrates a single platform server 102, a single application host 105, and a single client device 104, the system 100 can be implemented using a single, stand-alone computing device, two or more platform servers 102, two or more application hosts 105, or two or more client devices 104. Indeed, the server 102, the application host 105, and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the platform server 102, the application host 105, and the client device 104 may be adapted to execute any operating system, including Linux, UNIX, Windows, Mac OS®, Java™ OS, Android™, iOS or any other suitable operating system. According to one implementation, the platform server 102 and/or the application host 105 may also include or be communicably coupled with an e-mail server, a Web server, a caching server, a streaming data server, and/or other suitable server.

An interface 130, an interface 132, and the interface 116 are used by the client device 104, the platform server 102, and the application host 105, respectively, for communicating with other systems in a distributed environment—including within the system 100—connected to the network 106. Generally, the interfaces 130, 132, and 116 each comprise logic encoded in software and/or hardware in a suitable combination and operable to communicate with the network 106. More specifically, the interfaces 130, 132, and 116 may each comprise software supporting one or more communication protocols associated with communications such that the network 106 or interface's hardware is operable to communicate physical signals within and outside of the illustrated system 100.

The platform server 102 includes one or more processors 134. Similarly, the application host 105 includes one or more processors 136. Each processor in the processors 134 or 136 may be a central processing unit (CPU), a blade, an application specific integrated circuit (ASIC), a field-programmable gate array (FPGA), or another suitable component. Generally, each processor in the processors 134 or 136 executes instructions and manipulates data to perform the operations of the platform server 102 or the application host 105, respectively. For example, each processor 134 executes the functionality required to receive and respond to requests from the client device 104, for example. As another example, each processor 136 executes the functionality of the debugee instance 110 and the other instances 118.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The platform server 102 includes memory 138. The application host 105 includes memory 140. In some implementations, the platform server 102 and/or the application host 105 includes multiple memories. The memory 138 and the memory 140 may each include any type of memory or database module and may take the form of volatile and/or non-volatile memory including, without limitation, magnetic media, optical media, random access memory (RAM), read-only memory (ROM), removable media, or any other suitable local or remote memory component. The memory 138 and the memory 140 may each store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the platform server 102 or the application host 105, respectively.

The client device 104 may generally be any computing device operable to connect to or communicate with the platform server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the debugging tool 108. A client application is any type of application that allows the client device 104 to request and view content on the client device 104. In some implementations, a client application can use parameters, metadata, and other information received at launch to access a particular set of data from the platform server 102. In some instances, a client application may be an agent or client-side version of the one or more enterprise applications running on an enterprise server (not shown).

The client device 104 further includes one or more processors 142. Each processor 142 included in the client device 104 may be a central processing unit (CPU), an application specific integrated circuit (ASIC), a field-programmable gate array (FPGA), or another suitable component. Generally, each processor 142 included in the client device 104 executes instructions and manipulates data to perform the operations of the client device 104. Specifically, each processor 142 included in the client device 104 executes the functionality required to send requests to the server 102 and to receive and process responses from the platform server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the platform server 102, or the client device 104 itself, including digital data, visual information, or the GUI 128.

The GUI 128 of the client device 104 interfaces with at least a portion of the system 100 for any suitable purpose, including generating a visual representation of the debugging tool 108. In particular, the GUI 128 may be used to view the source code 109, various Web pages, or other user interfaces. Generally, the GUI 128 provides the user with an efficient and user-friendly presentation of business data provided by or communicated within the system. The GUI 128 may comprise a plurality of customizable frames or views having interactive fields, pull-down lists, and buttons operated by the user. The GUI 128 contemplates any suitable graphical user interface, such as a combination of a generic web browser, intelligent engine, and command line interface (CLI) that processes information and efficiently presents the results to the user visually.

Memory 144 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 144 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the platform server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
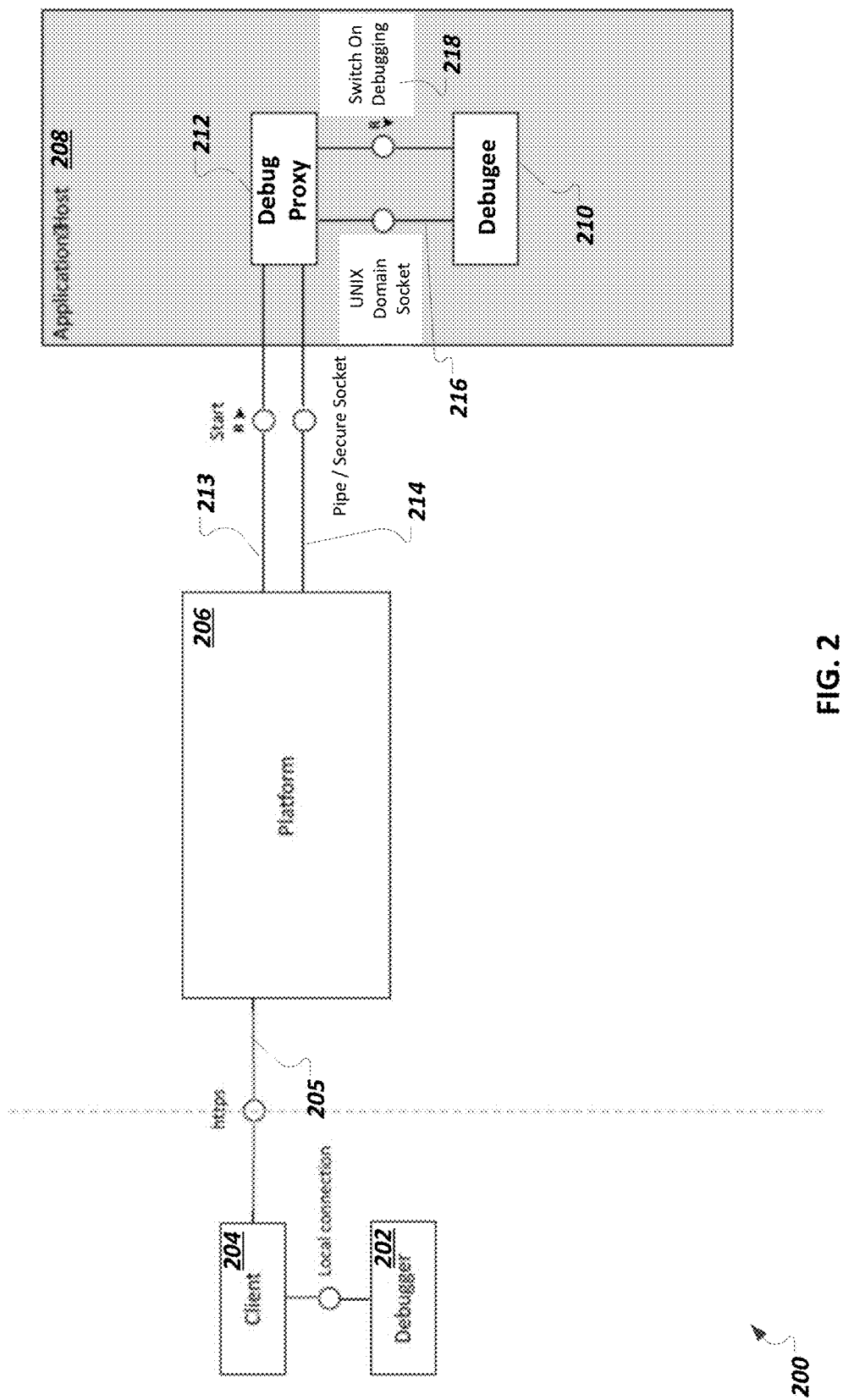
FIG. 2 is a block diagram illustrating an example private cloud environment.

FIG. 2 is a block diagram illustrating an example private cloud environment 200. A debugger 202 executes locally on a client device 204. A developer can, using the debugger 202, generate a request to remotely debug an application instance. The client device 204 can, on behalf of the debugger 202, submit a remote debugging request to a platform server 206. The client device 204 can connect to the platform server 206 using a secure connection 205, such as a HTTPS connection. The HTTPS connection 205 can provide encryption. The client device 204 can make the input and output streams of the HTTPS connection 205 available to the debugger 202. The operating system of the platform server 206 can provide user isolation at an operating system level. For example, the platform server 206 can execute application instances as different operating system users to prevent interference between applications and between applications and the platform server 206.

The platform server 206 can identify or select an application host 208. If the request from the client device 204 is to start an application instance in a debug mode, the platform server 206 can select the application host 208 for execution of a new application instance (e.g., a debugee 210) configured to wait for attachment of a debugger. If the request from the client device 204 is to debug a currently running instance, the platform server 206 can identify the debugee 210 as the currently running instance and the application host 208 as the host for the debugee 210.

The platform server 206 can initiate creation and/or instantiation of a debug proxy process 212 on the application host 208 (213). The platform server 206 can authorize the debug proxy process 212 to debug the debugee 210. The platform server 206 can create a secured connection 214 to the debug proxy process 212, such as using secure sockets, or some other type of secured authenticated inter-process communication.

The debug proxy 212 can create a secured connection 216 to the debugee 210, such as by using UNIX domain sockets or some other suitable type of connection. The secured connection 216 can provide security that is not available in a port-based default debugging service, for example. The use of a UNIX domain socket can prevent processes/users from connecting to the secured connection 216 without appropriate operating system privileges. The secured connection 216 is only accessible for a process running as the same operating system user as the application instance. The debug proxy 212 can send a request 218 to the debugee 210 to enable a debugging mode.

The connections 205, 214, and 216 provide an overall end-to-end connection between the client device 204 and the debugee 210. The developer can select, using the debugger 202, an entry point, one or more breakpoints, and other debugging commands, such as inspection and modification of data items. Corresponding debugging commands can be sent, over the connections 205, 214, and 216, to the debugee 210. The debugee 210, in debug mode, can process the debugging commands and send debugging data to the debug proxy 212. The debugging data can be forwarded to the platform server 206, over the connection 214, and then to the client device 204, over the connection 205, for use by the debugger 202. The client device 204 can send the debugging data to the debugger 202 using a secure local connection.

The developer can use the debugger 202 to submit a request to end the debugging session. The request to end the debugging session can be sent, over the connections 205, 214, and 216, to the debugee. The platform server 206 can initiate termination of the debug proxy 212 in response to the request to end the debugging session.

Approaches other than those shown in FIG. 2 can be used for remote debugging. For example, instead of creating and terminating the debug proxy 212 in response to each start and end of a debugging session, one or more debug proxy processes can be started in advance of any request for a debugging session, with the debug proxy processes each having a lifetime that exceeds a given debugging session. The platform server 206 can determine which debugging requests are handled by which debug proxy processes. As another example, in some implementations, the application host 208 may be directly accessible by the client device 204, and the client device 204 can establish a connection to the application host 208 (e.g., using secure sockets) without using the platform server 206. As yet another example, in some implementations, a port-based approach can be used if a debugging port is secured by a firewall. If the debugger 202 or the client device 204 unexpectedly terminate, the platform server can close the debugging sessions on behalf of the debugger 202.

Figure 3:
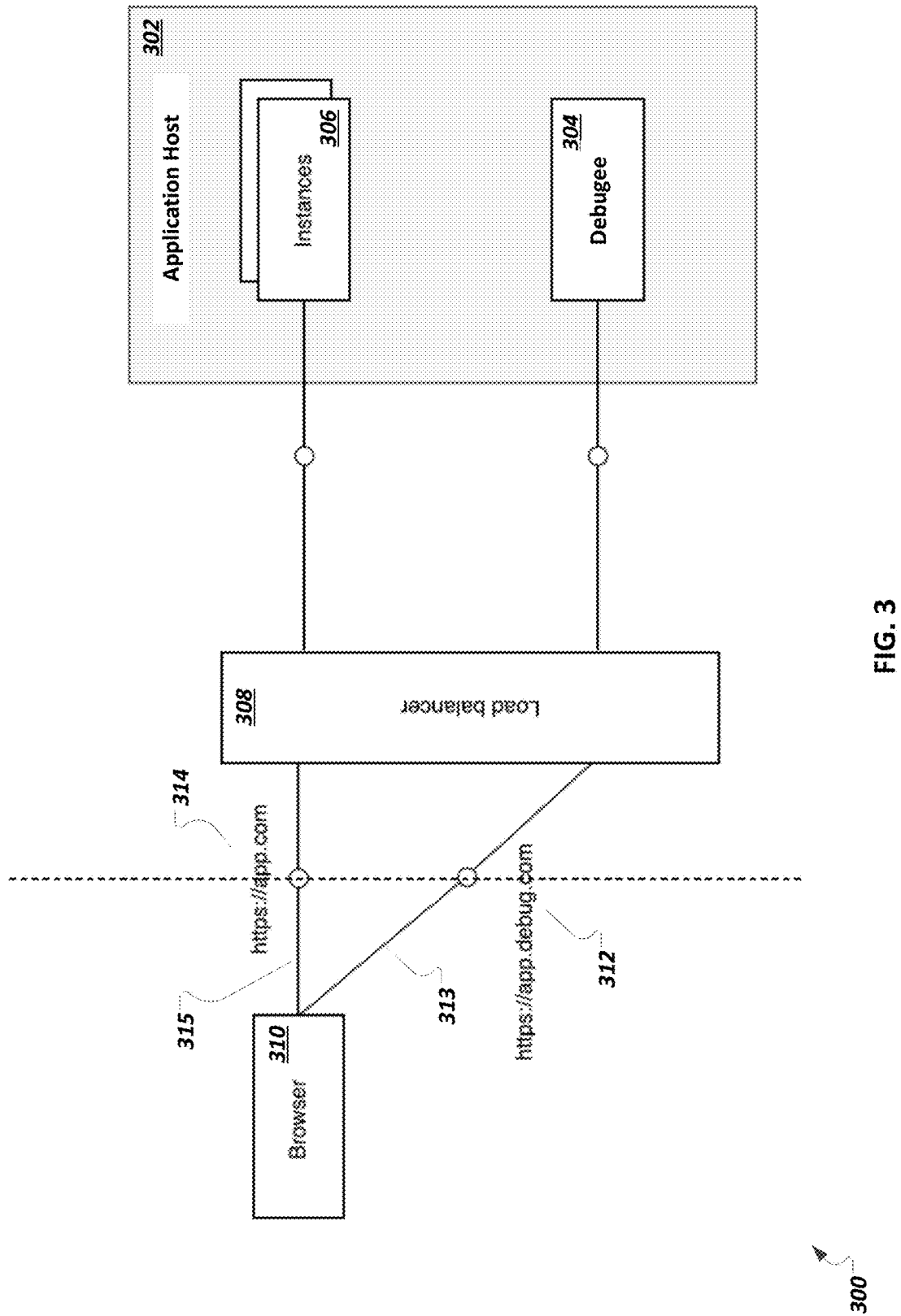
FIG. 3 is a block diagram illustrating an example system for identifying an application instance to debug from among multiple instances.

FIG. 3 is a block diagram illustrating an example system 300 for identifying an application instance to debug from among multiple instances. An application host 302 can be executing several instances, including a debugee 304 that a developer wishes to debug, and other instances 306. Some or all of the other instances 306 may be executing on other application hosts. The developer may want to debug the debugee 304 but not the other instances 306, for example. As another example, the application developer may want to enable debugging (for the developer and possibly other users) for the debugee 304 but not for the other instances 306.

A load balancer 308 (e.g., included in a platform server) can, for example, determine which application hosts are executing (or are to execute) which application instances. The load balancer 308 can also determine which incoming end-user client requests for the application are to be handled by which application instances. The developer may want to start the debugee 304 in a manner that communicates to the load balancer 308 that the debugee 304 will be used for debugging, so that the load balancer 308 can be configured to balance incoming end-user client requests for the application among the remaining other instances 306 and prevent end-user client requests from being sent to the debugee 304. Debugging-related requests, however, can be received at the debugee 304.

To distinguish communications from being targeted to the debugee 304 versus the other instances 306, different routes can be exposed by the platform and used from a browser 310 (e.g., executing a debugging tool) to obtain access to the load balancer 308. If all instances for the application are accessible using a same route, the developer may not have a way to identify the debugee 304 from among the other instances 306, for example. Different routes can be established by the use of different URLs for communications targeted for the debugee 304 vs communications targeted for non-debugee instances (e.g., the other instances 306).

For example, a first URL 312 (e.g., "https://app.debug.com") can be used for debug-related communications 313 sent by the browser 310 to the load balancer 308 and a second URL 314 (e.g., "https://app.com") can be used for non-debug related communications 315 sent to the load balancer 308 by the browser 310 or by other, end-user browsers. Separating debug communications from non-debug communications can enable a developer to debug an instance without affecting (or reducing an effect) on other, e.g., production instances. The developer can use a break point, for example, to halt and step through the execution of the debugee 304 while the other instances 306 handle requests from other users.

Figure 4:
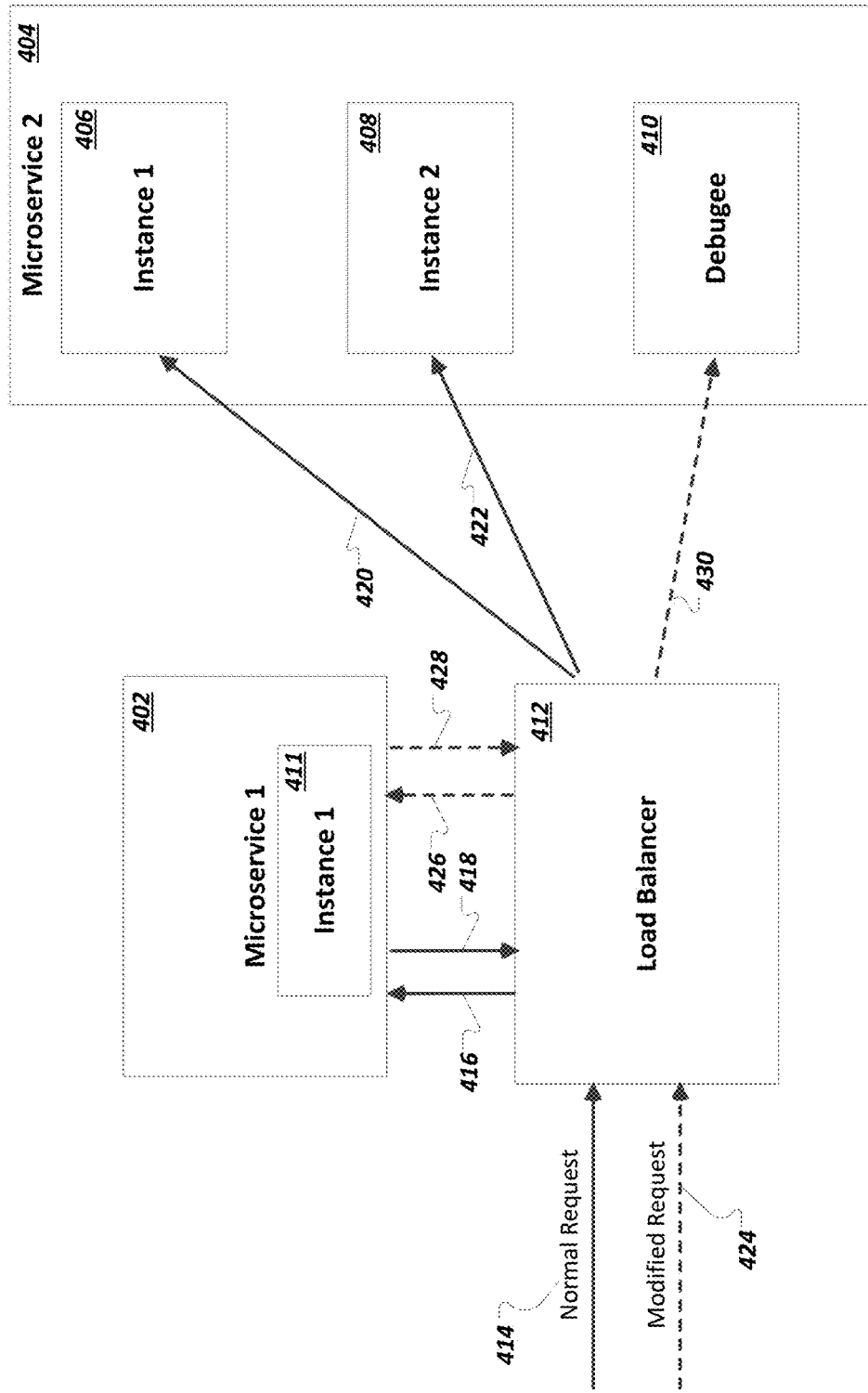
FIG. 4 is a block diagram illustrating an example system for debugging an application that uses multiple microservices.

FIG. 4 is a block diagram illustrating an example system 400 for debugging an application that uses multiple microservices. In a microservice architecture, an application can be composed of multiple, separate, independent services, called microservices. Each microservice can provide particular functionality. Some microservices invoke other microservices. A challenge can arise if a developer wants to debug a version of a particular microservice instance that is invoked by another microservice.

For example, a first microservice 402 ("Microservice 1") can invoke a second microservice 404 ("Microservice 2"). The second microservice 404 may be reachable (e.g., using a request actually used in production systems) only through the first microservice 402, for example. There may be multiple instances of the second microservice 404, such as an instance 406, an instance 408, and a debugee 410, with the debugee 410 being the instance the developer wishes to debug. In the example of FIG. 4, there is one instance of the first microservice 402 (e.g., an instance 411).

In non-debug operation, a load balancer 412 can receive a request 414 (e.g., from a browser) for functionality to be performed by the first microservice 402. The request 414 can be sent to the load balancer 412 in response to a user action in the browser or in response to some other trigger. The load balancer 412 can identify the instance 411 as the only instance of the first microservice 402, select the instance 411 for execution of the request 414, and forward the request 414 (or information included in the request 414) to the instance 411 (e.g., as a forwarded request 416).

As part of processing the request 414, the instance 411 of the first microservice 402 can invoke the second microservice 404. The instance 411 can send a request 418 to the load balancer 412 for execution of the second microservice 404. The load balancer 412 can select a particular instance of the second microservice 404 to handle the request 418, such as the instance 406 (e.g., as illustrated by a request 420), or the instance 408 (e.g., as illustrated by a request 422).

In a debug scenario, the developer may wish to have the debugee 410 invoked by the instance 411 (or another first microservice 402 instance). To signal the load balancer 412 to select the debugee 410, the developer can configure a modified request 424 to be sent to the load balancer 412 for invocation of the first microservice 402. Like the request 414, the modified request 424 may correspond to a request sent in response to a user action in the browser or to some other event that triggers an action that the developer desires to debug. The modified request 424 can differ from the request 414, for example, by inclusion of metadata in the request 424 that is not in the request 414, such as an HTTP header, a cookie, or some other identifier.

The modified request 424 (or information included in the modified request 424) can be forwarded by the load balancer 412 to the instance 411 (e.g., as a forwarded modified request 426). The instance 411 can, while processing the forwarded modified request 426, invoke the second microservice 404. The instance 411 can send a request 428 to the load balancer 412 for execution of the second microservice 404. The request 428 can include the metadata included in the modified request 424. The load balancer 412 can identify the metadata included in the request 428. The load balancer 412 can be configured to select the debugee 410, instead of the instance 406 or the instance 408, to handle the request 428 (e.g., as illustrated by a request 430).

Figure 5:
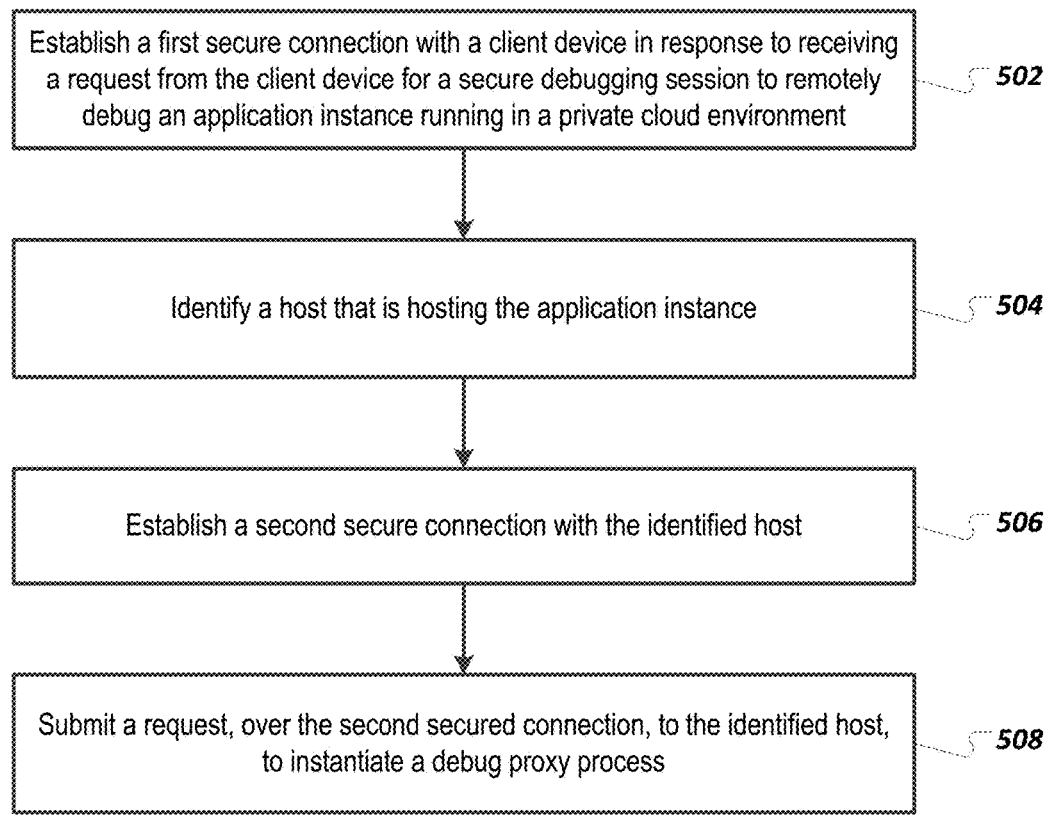
FIG. 5 is a flowchart of an example method for remotely debugging applications in a private cloud environment.

FIG. 5 is a flowchart of an example method 500 for remotely debugging applications in a private cloud environment. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the platform server 102 of FIG. 1.

At 502, a first secure connection is established with a client device in response to receiving a request from the client device for a secure debugging session to remotely debug an application instance running in a private cloud environment. The request can be associated with a debugging tool executing on the client device. The first secure connection can be a HTTPS connection. The first secure connection can be an encrypted and authenticated connection. The request can identify the application instance. The request can be to start the application instance in a debug mode. As another example, the application instance can be currently running and the request can be to put the currently running application instance in a debug mode. In some instances, the application instance can be a microservice that is invoked by another microservice.

At 504, a host that is hosting the application instance is identified. The host can be identified from among multiple hosts. The application instance can be one of multiple application instances for the application.

At 506, a second secure connection is established with the identified host. The second secure connection can be a secure socket, or some other type of secured connection.

At 508, a request is submitted, over the second secured connection, to the identified host, to instantiate a debug proxy process. The debug proxy process can be configured to establish a secure inter-process communication channel with the application instance and instruct the application instance to run in a debug mode. The secure inter-process communication channel can be a named pipe, a UNIX domain socket, or some other type of inter-process communication.

After the application instance has been put in a debug mode, debugging instructions can be received, from the client device, over the first secure connection. The received debugging instructions can be provided to the debug proxy, over the second secure connection. The debug proxy can be configured to send the debugging instructions, over the secure inter-process communication channel, to the application instance, and receive debugging data from the application instance. Debugging data can be received from the debug proxy process over the second secure connection and provided to the client device.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 200 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, comprising:
establishing a first secure connection with a client device in response to receiving a first request from the client device for a secure debugging session to remotely debug a first microservice running in a private cloud environment, the first microservice configured to invoke a second microservice, wherein the first request includes metadata that identifies a particular instance of the second microservice that is running in the private cloud environment along with at least one other instance of the second microservice;
invoking the first microservice in response to receiving the first request, including providing the metadata to the first microservice;
receiving a second request from the first microservice to invoke the second microserivce, the second request including the metadata that identifies the particular instance of the second microservice;
identifying a host that is hosting the second microservice;
establishing a second secure connection with the identified host; and
submitting a third request, over the second secured connection, to the identified host, to instantiate a debug proxy process, wherein the third request instructs the debug proxy process to establish a secure inter-process communication channel with the particular instance of the second microservice and instruct the particular instance of the second microservice to run in a debug mode.

2. The method of claim 1, further comprising:
receiving, over the first secure connection, debugging instructions from the client device;
providing, over the second secure connection, the received debugging instructions to the debug proxy, wherein the debug proxy is configured to send the debugging instructions, over the secure inter-process communication channel, to the particular instance of the second microservice, and receive debugging data from the particular instance of the second microservice;
receiving debugging data from the debug proxy process over the second secure connection; and
providing, over the first secure connection and to the client device, the received debugging data.

3. The method of claim 1, wherein the first secure connection is a HTTPS connection.

4. The method of claim 1, wherein the second secure connection is a secure socket.

5. The method of claim 1, wherein the secure inter-process communication channel is a named pipe.

6. The method of claim 1, wherein the secure inter-process communication channel is a UNIX domain socket.

7. The method of claim 1, wherein the metadata identifies the particular instance of the second microservice using a URL (Uniform Resource Locator) that is a different URL used for other instances of the second microservice.

8. The method of claim 1, wherein the first request is to start the first microservice in a debug mode.

9. The method of claim 1, wherein the first microservice is currently running and the request is to put the currently running first microservice in a debug mode.

10. A system comprising:
one or more computers; and
a non-transitory computer-readable medium coupled to the one or more computers having instructions stored thereon which, when executed by the one or more computers, cause the one or more computers to perform operations comprising:
establishing a first secure connection with a client device in response to receiving a first request from the client device for a secure debugging session to remotely debug a first microservice running in a private cloud environment, the first microservice configured to invoke a second microservice, wherein the first request includes metadata that identifies a particular instance of the second microservice that is running in the private cloud environment along with at least one other instance of the second microservice;
invoking the first microservice in response to receiving the first request, including providing the metadata to the first microservice;
receiving a second request from the first microservice to invoke the second microserivce, the second request including the metadata that identifies the particular instance of the second microservice;
identifying a host that is hosting the second microservice;
establishing a second secure connection with the identified host; and
submitting a third request, over the second secured connection, to the identified host, to instantiate a debug proxy process, wherein the third request instructs the debug proxy process to establish a secure inter-process communication channel with the particular instance of the second microservice and instruct the particular instance of the second microservice to run in a debug mode.

11. The system of claim 10, the operations further comprising:
receiving, over the first secure connection, debugging instructions from the client device;
providing, over the second secure connection, the received debugging instructions to the debug proxy, wherein the debug proxy is configured to send the debugging instructions, over the secure inter-process communication channel, to the particular instance of the second microservice, and receive debugging data from the particular instance of the second microservice;
receiving debugging data from the debug proxy process over the second secure connection; and
providing, over the first secure connection and to the client device, the received debugging data.

12. The system of claim 10, wherein the first secure connection is a HTTPS connection.

13. The system of claim 10, wherein the second secure connection is a secure socket.

14. The system of claim 10, wherein the secure inter-process communication channel is a named pipe.

15. A computer program product encoded on a non-transitory storage medium, the product comprising non-transitory, computer readable instructions for causing one or more processors to perform operations comprising:
establishing a first secure connection with a client device in response to receiving a first request from the client device for a secure debugging session to remotely debug a first microservice running in a private cloud environment, the first microservice configured to invoke a second microservice, wherein the first request includes metadata that identifies a particular instance of the second microservice that is running in the private cloud environment along with at least one other instance of the second microservice;
invoking the first microservice in response to receiving the first request, including providing the metadata to the first microservice;
receiving a second request from the first microservice to invoke the second microservice, the second request including the metadata that identifies the particular instance of the second microservice;
identifying a host that is hosting the second microservice;
establishing a second secure connection with the identified host; and
submitting a third request, over the second secured connection, to the identified host, to instantiate a debug proxy process, wherein the third request instructs the debug proxy process to establish a secure inter-process communication channel with the particular instance of the second microservice and instruct the particular instance of the second microservice to run in a debug mode.

16. The computer program product of claim 15, further comprising:
receiving, over the first secure connection, debugging instructions from the client device;
providing, over the second secure connection, the received debugging instructions to the debug proxy, wherein the debug proxy is configured to send the debugging instructions, over the secure inter-process communication channel, to the particular instance of the second microservice, and receive debugging data from the particular instance of the second microservice;
receiving debugging data from the debug proxy process over the second secure connection; and
providing, over the first secure connection and to the client device, the received debugging data.

17. The computer program product of claim 15, wherein the first secure connection is a HTTPS connection.

18. The computer program product of claim 15, wherein the second secure connection is a secure socket.

* * * * *